(12) United States Patent
Miller et al.

(10) Patent No.: US 7,965,314 B1
(45) Date of Patent: *Jun. 21, 2011

(54) FOVEAL CAMERA SYSTEMS AND METHODS

(75) Inventors: John L. Miller, Lake Oswego, OR (US);
Jeff Frank, Santa Barbara, CA (US);
Andrew C. Teich, West Linn, OR (US)

(73) Assignee: Flir Systems, Inc., Wilsonville, OR (US)

( * ) Notice: Subject to any disclaimer, the term of this patent is extended or adjusted under 35 U.S.C. 154(b) by 1467 days.

This patent is subject to a terminal disclaimer.

(21) Appl. No.: 11/388,696

(22) Filed: Mar. 23, 2006

Related U.S. Application Data

(63) Continuation-in-part of application No. 11/053,991, filed on Feb. 9, 2005, now Pat. No. 7,663,662.

(51) Int. Cl.
*H04N 5/33* (2006.01)
*G02F 1/01* (2006.01)

(52) U.S. Cl. ........................... 348/164; 250/330

(58) Field of Classification Search .............. 348/164, 348/333.12; 356/5.04; 345/698
See application file for complete search history.

(56) References Cited

U.S. PATENT DOCUMENTS

| | | | |
|---|---|---|---|
| 3,922,549 A | 11/1975 | Back | |
| 3,934,250 A | 1/1976 | Martin, Jr. | |
| 5,005,083 A | 4/1991 | Grage et al. | |
| 5,852,492 A * | 12/1998 | Nimblett et al. | 356/5.04 |
| 6,320,610 B1 | 11/2001 | Van Sant et al. | |
| 6,323,858 B1 | 11/2001 | Gilbert et al. | |
| 6,337,683 B1 | 1/2002 | Gilbert et al. | |
| 6,654,019 B2 | 11/2003 | Gilbert et al. | |
| 6,738,073 B2 | 5/2004 | Park et al. | |
| 6,781,606 B2 * | 8/2004 | Jouppi | 345/698 |
| 7,129,981 B2 * | 10/2006 | Berstis | 348/333.12 |
| 7,646,404 B2 * | 1/2010 | Liu et al. | 348/218.1 |
| 2005/0062869 A1 | 3/2005 | Zimmermann et al. | |
| 2006/0028547 A1 | 2/2006 | Chang | |

OTHER PUBLICATIONS

P. Warren et al., "Multi-Band Color Fusion Techniques", Naval Research Laboratory, Mar. 2, 1998.
Peter J. Burt; "The Laplacian Pyramid as a Compact Image Code"; IEEE, vol. 31, No. 4; Apr. 1983.
C. Pohl and J.L. Van Genderen; "Multisensor Image Fusion in Remote Sensing Concepts, Methods and Applications"; INT J. Remote Sensing, vol. 19, No. 5, 823-854; 1998.
K. Schutte, "Fusion of IR and Visual Images", TNO document, FEL-97-B046, Feb. 4, 1997.
Paul Chevrette et al.; "Wide Area Cover Infrared Surveillance System (Infrared Eye)"; Defense Research Establishment; Jul. 1998.

\* cited by examiner

*Primary Examiner* — Gims S Philippe
(74) *Attorney, Agent, or Firm* — Haynes and Boone, LLP

(57) ABSTRACT

Systems and methods are disclosed for providing foveal images. For example, high and low resolution images can be combined to provide foveal images. Parameters other than resolution can vary between the larger and smaller images of the foveal image. Real, artificial, 2D and 3D images can be used in any desired combination to form foveal images. The use of such foveal images can substantially enhance the ability of viewers to accurately and reliably interpret the content of images and provide reduce bandwidth for image transmission.

37 Claims, 11 Drawing Sheets

FOVEAL CAMERA SYSTEMS AND METHODS

PRIORITY CLAIM

This application is a continuation-in-part (CIP) patent application of U.S. application Ser. No. 11/053,991, filed Feb. 9, 2005 now U.S. Pat. No. 7,663,622, and entitled HIGH AND LOW RESOLUTION CAMERA SYSTEMS AND METHODS, which is incorporated herein by reference in its entirety.

TECHNICAL FIELD

The present invention relates generally to cameras and, more particularly, to camera systems and methods, such as for example camera systems suitable for providing foveal images.

BACKGROUND

Cameras and various types of camera systems are well known and applied in a wide variety of applications to view and/or record images. A typical application, for example, of a camera system is to provide surveillance, such as for perimeter and facility security or general area awareness or monitoring of a given area. However, conventional cameras and camera systems have a number of potential drawbacks.

For example, a conventional camera or camera system for surveillance typically has a limited or narrow field of view. To overcome this limitation, for example, the camera may be mechanically driven to point at a desired area to be monitored that is outside of its normal field of view. However, this allows a portion of the required field of view to be unmonitored for a certain period of time, depending upon the slewing parameters of the mechanically driven camera.

As another example, a conventional camera may include a field of view that can be switched between a wide field of view and a narrow field of view (such as via a zoom feature). A user, for example, may switch to the narrow field of view to provide a higher resolution for an area of interest. However, it may be difficult to locate immediately the desired area of interest when switching to the narrow field of view (e.g., due to movement of a subject and/or due to time delays associated with the switching), sometimes referred to as a loss of track problem. Additionally, multi-phenomenological imagery using (but not limited to) multiple polarizations, 3-d LIDAR imagery or other techniques have this same limitation. Also, it is desirable to transmit wide field of view imagery from UAVs, remote cameras, and the like for situational awareness, as well as narrow field of view detailed imagery; however the bandwidth can limit the amount of highly-detailed narrow FOV imagery. As a result, there is a need for an improved camera and camera techniques.

SUMMARY

Systems and methods for providing foveal images are disclosed herein. More specifically, in accordance with an embodiment of the present invention, a camera system includes a narrow field of view camera along with a wide field of view camera. Consequently, the camera system may provide wide and narrow fields of view simultaneously in a foveal presentation. An operator may select the narrow field of view to be located and displayed within the wide field of view's display area. Furthermore, multiple operators of the camera system may select different views to be provided by the camera system (e.g., a wide field of view, a narrow field of view, or the combination of the wide and narrow field of views). The camera system may further provide certain benefits relative to a conventional camera system, for example, in terms of a higher degree of reliability (e.g., due to fewer moving parts or camera redundancy). The narrow field of view camera and/or the wide field of view camera can be infrared cameras, for example, or alternatively any other desired type of cameras.

Indeed, more than two cameras can be used in any desired combination of types. For example, an infrared narrow field of view camera, an infrared wide field of view camera, and a visible light wide field of view camera can be used. The foveal image can then be formed by simultaneously displaying images from the infrared narrow field of view within the wide field of view display for either the wide field of view infrared camera or the wide field of view visible light camera.

In accordance with various embodiments of the present invention, the foveal images can comprise any desired combination of parameters. Examples of parameters include color balance, color fusion, compression (type and/or rate), contrast, edge enhancement, encoding, field of view, focus (auto versus manual focus and/or sharp versus fuzzy focus), frame rate, illumination (e.g., passive/active), intensity (brightness), magnification, phase, polarization, spectrum (e.g., visible, infrared, and/or other electromagnetic regions), warping, and image stabilization. That is, the narrow field of view or smaller image can vary with respect to the wide field of view or larger image in any parameter or combination of parameters that one image can vary in with respect to another image.

Further, more than one narrow field of view can be displayed within the wide field of view display. For example, two, three, four, or more narrow fields of view, such as from a corresponding number of narrow field of view cameras, can be displayed within the wide field of view display. The wide field of view display and each of the narrow field of view displays can have any desired combination of the noted parameters, for example.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
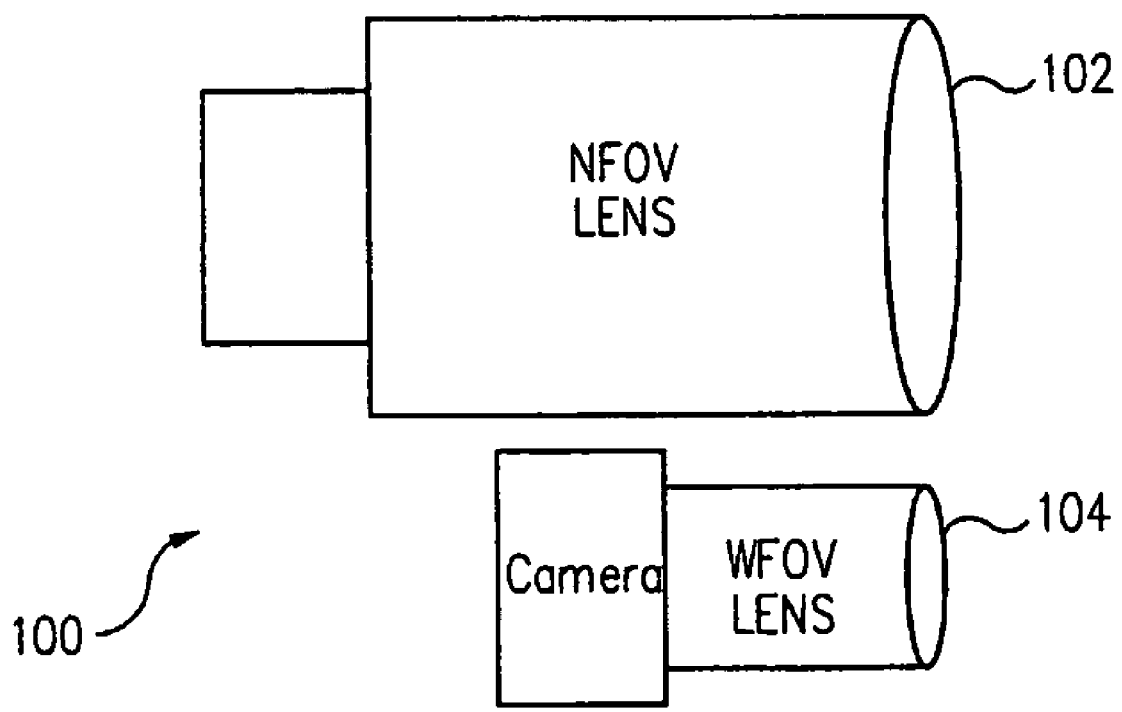
FIG. 1 shows a block diagram illustrating a camera system in accordance with an embodiment of the present invention.

FIG. 1 shows a block diagram illustrating a camera system 100 that can be used to form foveal images in accordance with an embodiment of the present invention. Camera system 100 includes a camera 102 (e.g., a narrow field of view (NFOV) camera) and a camera 104 (e.g., a wide field of view (WFOV) camera).

Cameras 102 and 104, for example, may be implemented as infrared cameras (cooled or uncooled), which may be incorporated into a single camera housing as part of a camera system. As a specific implementation example, cameras 102 and 104 may represent infrared cameras (e.g., Photon infrared cameras), which are available from FLIR Systems™ Inc. As described further herein, cameras 102 and 104 may form part of a camera system that provides simultaneous views of an area of interest for one or more operators of the camera system. For example, as explained further herein, cameras 102 and 104 may be employed to provide foveal vision by utilizing the different FOV optics, with the image from camera 102 (NFOV) overlaid onto the image from camera 104 (WFOV).

Figure 2:
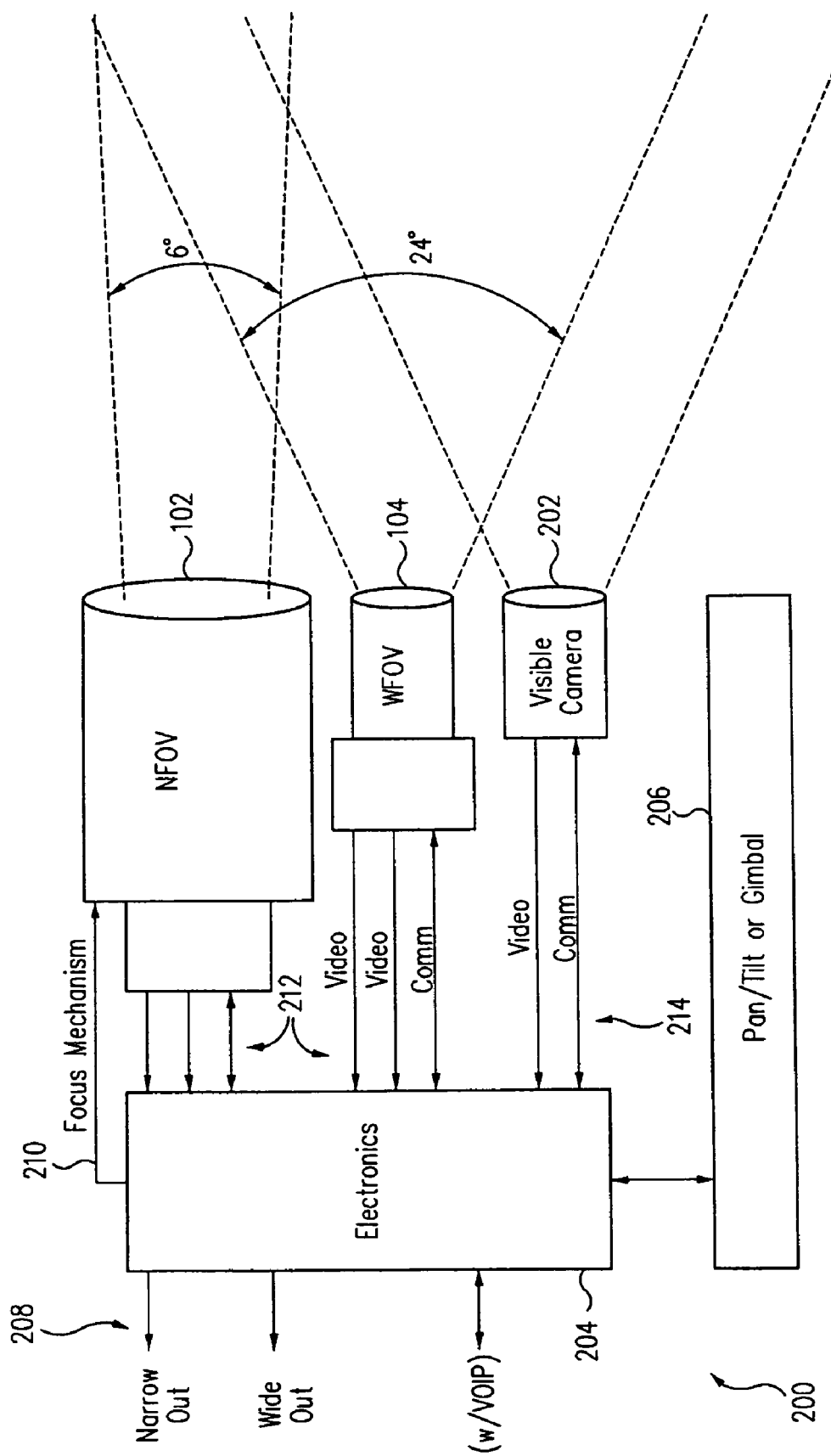
FIG. 2 shows a block diagram illustrating a camera system in accordance with an embodiment of the present invention.

As an example, FIG. 2 shows a block diagram illustrating a camera system 200 that can be used to form foveal images in accordance with an embodiment of the present invention. Camera system 200 includes cameras 102 and 104, a camera 202, system electronics 204, and a directional control 206. Camera system 200 may be incorporated into a camera housing to form a camera unit for mounting or positioning to provide views of a desired area.

Cameras 102 and 104 may represent infrared cameras, while camera 202 may represent an optional camera for providing images in the visible electromagnetic spectrum. For example, camera 102 may provide a NFOV (e.g., a field of view of approximately 6 degrees), camera 104 may provide a WFOV (e.g., a field of view of approximately 24 degrees), and camera 202 may provide a FOV based on a normal lens (e.g., 50 mm focal length), a wide angle lens (e.g., 18 mm focal length), a telephoto lens (e.g., 200 mm focal length) or a vari-focal or zoom lens.

Cameras 102, 104, and 202 may be aligned so that their field of views overlap or are centered (e.g., boresight) at approximately the same area for a given distance. Directional control 206 (e.g., a pan/tilt directional control) allows a user to control the focal direction or orientation of camera system 200. For example, directional control 206 allows a user to manually direct or point camera system 200 in a direction of interest for the user by the user issuing commands to camera system 200. Directional control 206 may also be automated to scan repeatedly or randomly over an area of interest. Furthermore, directional control 206 may also optionally be implemented to control cameras 102, 104, and 202 individually so that each may be independently controlled and pointed in a desired direction.

System electronics 204, for example, receives or provides various interface signals 208, 210, 212, and 214 for camera system 200. Interface signals 208 may represent or include various control signals (e.g., Pelco-D protocol control signals) to and from camera system 200 and data signals, such as for example data from camera 102 (e.g., narrow analog out data), camera 104 (e.g., wide analog out data), and camera 202. Interface signals 208 may be communicated via a wireless or a wired interface (e.g., Ethernet connection).

System electronics 204 may control directional control 206 as well as cameras 102, 104, and 202. For example, system electronics 204 may control the focus of camera 102 (e.g., via a focus mechanism control signal 210). System electronics 204 generally receives data signals (e.g., analog and/or digital video) from cameras 102, 104, and 202 and transfers communication (comm) signals to and from cameras 102, 104, and 202 via interface signals 212 and 214.

Figure 3:
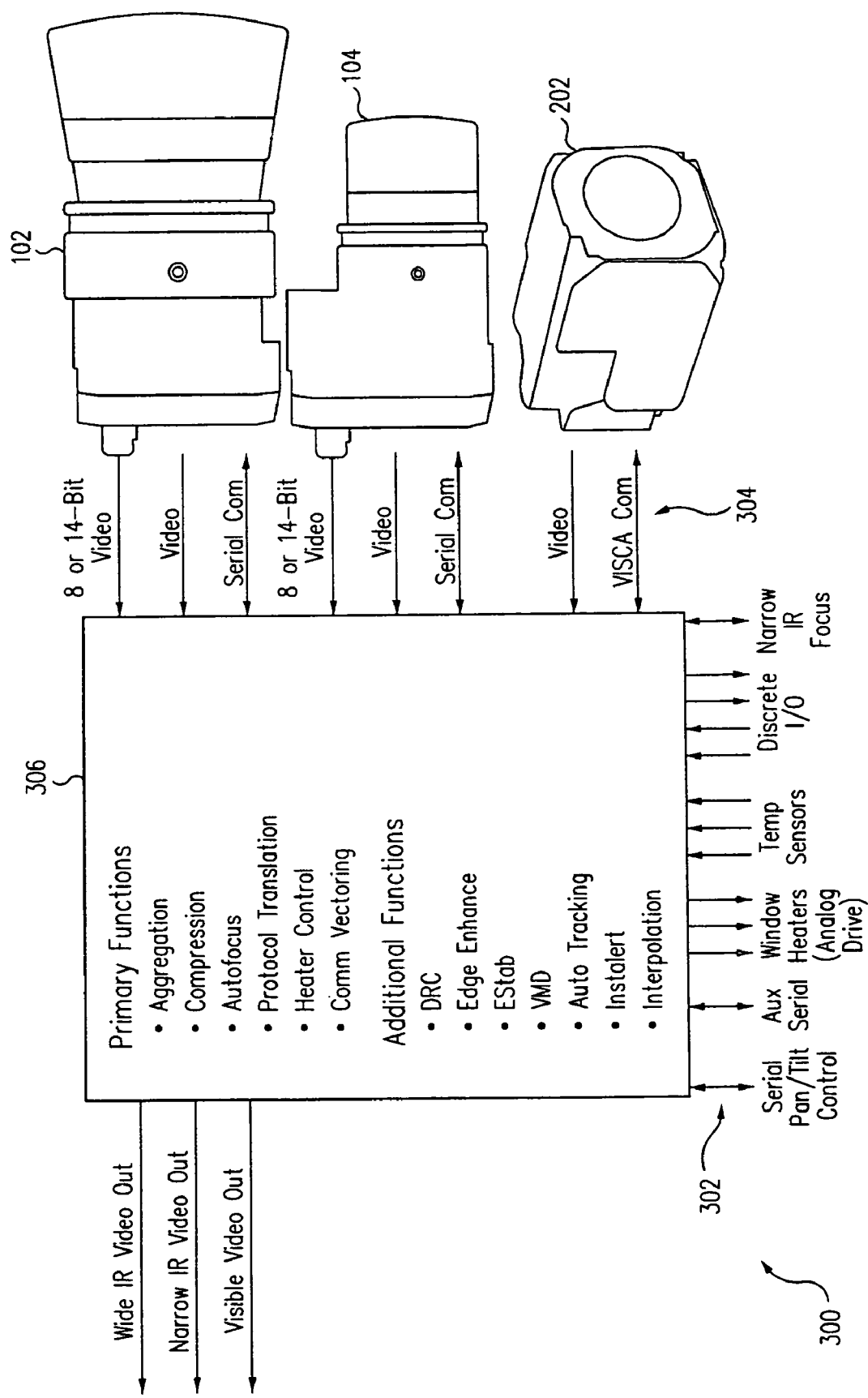
FIG. 3 shows a block diagram illustrating a camera system in accordance with an embodiment of the present invention.

FIG. 3 shows a block diagram illustrating a camera system 300 that can be used to form foveal images in accordance with an embodiment of the present invention. Camera system 300 may represent a more specific functional implementation of camera system 200 and highlight various exemplary functions or input/output signal flow (e.g., an exemplary system block diagram). A functional block 306 may represent functions for system electronics 204 or camera system functions performed, for example, by camera system 200 and an external device (e.g., a computer or other type of processing device adapted to utilize the data provided by camera system 200).

Functional block 306 can also be viewed as a processor that performs, among other things, the functions listed therein. The processor has a plurality of input ports for communicating signals thereto and a plurality of output ports for communicating signals therefrom.

Cameras 102, 104, and 202 via interface signals 304 transfer control signals (e.g., serial communication (com) or VISCA protocol communication (com)) and data (e.g., 8 or 14 bit digital video and/or analog video) to and/or from functional block 306. Furthermore, interface signals 302 provide various interfaces for camera system 300, such as for example, power (e.g., 10-32 VDC Power or 24 VAC), serial pan/tilt control, data out (e.g., wide infrared (IR) analog video out, narrow IR analog video out, and/or visible analog video out), along with input/output (I/O) signals (e.g., auxiliary serial or discrete I/O) for signals such as window heaters, temperature sensors, and focusing (e.g., for camera 202 or narrow IR focus for camera 102). Interface signals 302 may be provided over various types of wired (e.g., RS-422 or Ethernet) or wireless (e.g., 802.11g) interfaces.

For example, Table 1 provides exemplary camera parameters and bandwidth estimates for camera system 300. Furthermore, Table 1 illustrates the number of camera systems 300 that may be supported on a 10T, 100T, and 1000T Ethernet network.

TABLE 1

|  | Overall Maximum | 8-Bit IR, Uncompressed | Lossless Compression | Lossy-Compression |
|---|---|---|---|---|
| Narrow IR Camera | | | | |
| Horzontal | 320 | 320 | 320 | 320 |
| Vertical | 256 | 256 | 256 | 256 |
| Frame Rate | 30 | 30 | 30 | 30 |
| Bits/Pixel | 14 | 8 | 8 | 8 |
| Compression Ratio | 1 | 1 | 5 | 50 |
| Bit Rate | 34,406,400 | 19,660,800 | 3,932,160 | 393,216 |
| Wide IR Camera | | | | |
| Horzontal | 320 | 320 | 320 | 320 |
| Vertical | 256 | 256 | 256 | 256 |
| Frame Rate | 30 | 30 | 30 | 30 |
| Bits/Pixel | 14 | 8 | 8 | 8 |
| Compression Ratio | 1 | 1 | 5 | 50 |
| Bit Rate | 34,406,400 | 19,660,800 | 3,932,160 | 393,216 |
| Visible IR Camera | | | | |
| Horzontal | 640 | 640 | 640 | 640 |
| Vertical | 512 | 512 | 512 | 512 |
| Frame Rate | 30 | 30 | 30 | 30 |
| Bits/Pixel | 8 | 8 | 8 | 8 |
| Compression Ratio | 1 | 1 | 5 | 50 |
| Bit Rate | 78,643,200 | 78,643,200 | 15,728,640 | 1,572,864 |
| Network Efficiency | 75% | 75% | 75% | 75% |
| Total Bit Rate | 196,608,000 | 157,286,400 | 31,457,280 | 3,145,728 |
| Cameras on 10T | 0 | 0 | 0 | 3 |
| Cameras on 100T | 1 | 1 | 3 | 32 |
| Cameras on 1000T | 5 | 6 | 32 | 318 |

Camera system 300 may provide or in conjunction with an external device provide various functions, such as for example aggregation and/or compression of the data, auto focus, protocol translation, heater control, and communication vectoring. Camera system 300 may further provide, for example, dynamic range compression (DRC), edge enhancement, electronic image stabilization (EStab), video motion detection (VMD), auto tracking, image object tagging (e.g., Instalert™ available from FLIR Systems™, Inc.), and interpolation. Furthermore, various features for cameras 102, 104, and/or 202 may be provided, such as for example non-uniform correction (NUC), automatic gain control (AGC), temporal filtering, and analog video generation.

Figure 4:
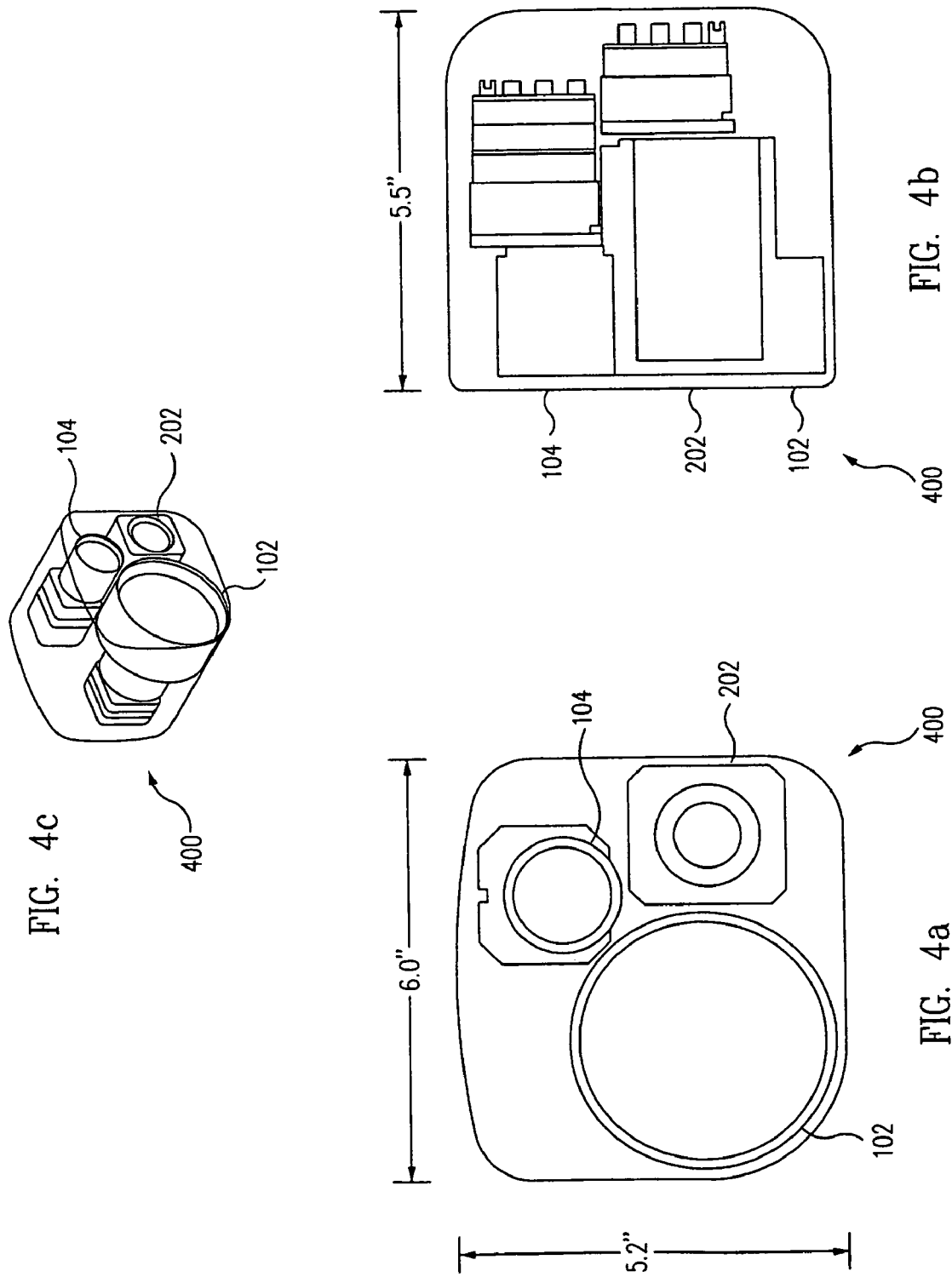
FIGS. 4a, 4b, and 4c show front, side, and perspective views, respectively, which illustrate a camera system in accordance with an embodiment of the present invention.

FIGS. 4a, 4b, and 4c show front, side, and perspective views, respectively, which illustrate a camera system 400 that can be used to form foveal images in accordance with an embodiment of the present invention. Camera system 400 represents a single camera housing that incorporates cameras 102, 104, and 202 and provides one or more of the features or functions discussed in reference to camera system 200 (FIG. 2) and/or camera system 300 (FIG. 3). Camera system 400 provides an enclosed unit (e.g., with exemplary dimensions of 6 by 5.5 by 5.2 inches) that may be mounted as desired to provide IR and visible views of an area.

Figure 5:
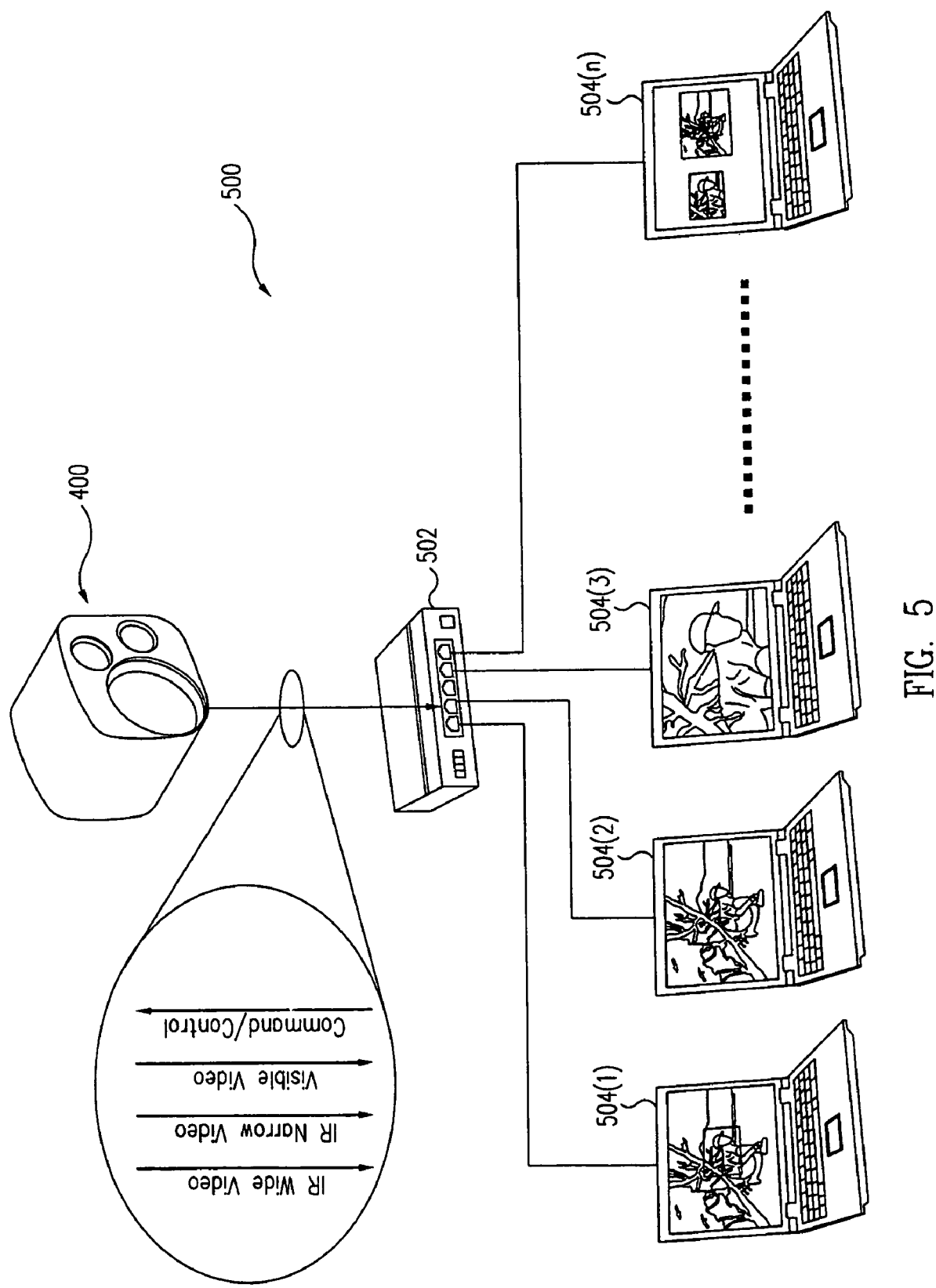
FIG. 5 shows a block diagram illustrating a camera system in accordance with an embodiment of the present invention.

Camera system 400 may be incorporated into a system that includes one or more of camera systems 400. For example, FIG. 5 shows a block diagram illustrating a camera system 500 in accordance with an embodiment of the present invention. Camera system 500 can display both foveal and non-foveal images. Camera system 500 includes camera system 400 and one or more devices 504 (which are separately referenced as devices 504(1) through 504(n), where n represents the number of devices 504).

Each device 504 may represent, for example, a computer for receiving data from camera system 400 and displaying the data on a display of device 504. Device 504 may also provide control signals (commands) to camera system 400 to control, for example, the pointing or slewing (e.g., pan, tilt, or zoom) of camera system 400 or the focusing of one or more of the cameras (e.g., cameras 102 or 202). Device 504 and camera system 400 may transfer this information wirelessly or through a wired connection, such as for example via an Ethernet connection.

A router 502 (or other conventional device, e.g., a hub or a switch) may be utilized to distribute information from one or more camera systems 400 to more than one device 504 and/or each device 504 may communicate directly with camera system(s) 400. Devices 504(1) through 504(n) may then selectively view data from each camera system 400 under control of a user of the particular device 504.

For example assuming one camera system 400 within camera system 500, device 504(2) may display data from camera 104 or camera 202, while device 504(3) may display data from camera 102 (e.g., a narrow, magnified view of the image displayed on device 504(2)). Meanwhile for example, device 504(n) may show in separate portions of its display the data from camera 102, camera 104, and/or camera 202 (e.g., multiple views), while device 504(1) may display data from camera 104 along with the data from camera 102 (e.g., an inset or image overlay, referred to herein as foveal approach, foveal vision, or foveal display as discussed herein).

Figure 6:
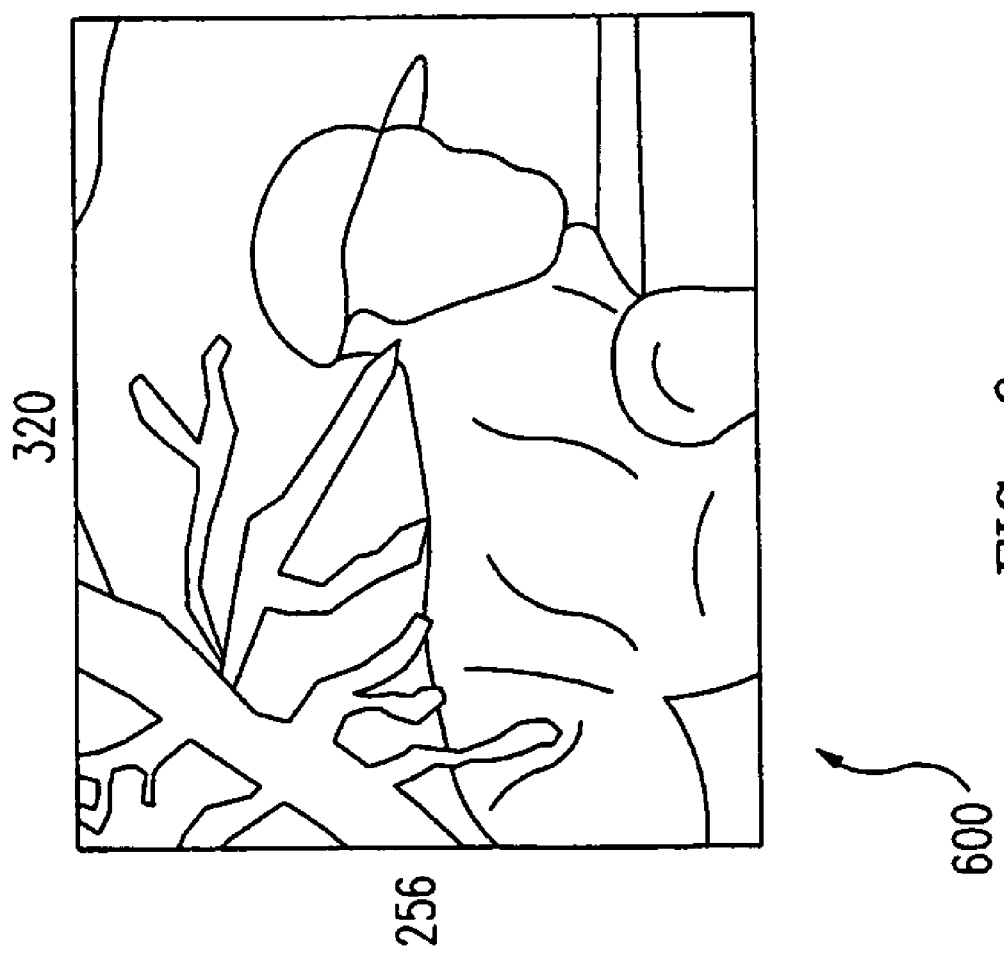
FIG. 6 shows an exemplary view provided by one camera within a camera system in accordance with an embodiment of the present invention.
Figure 7:
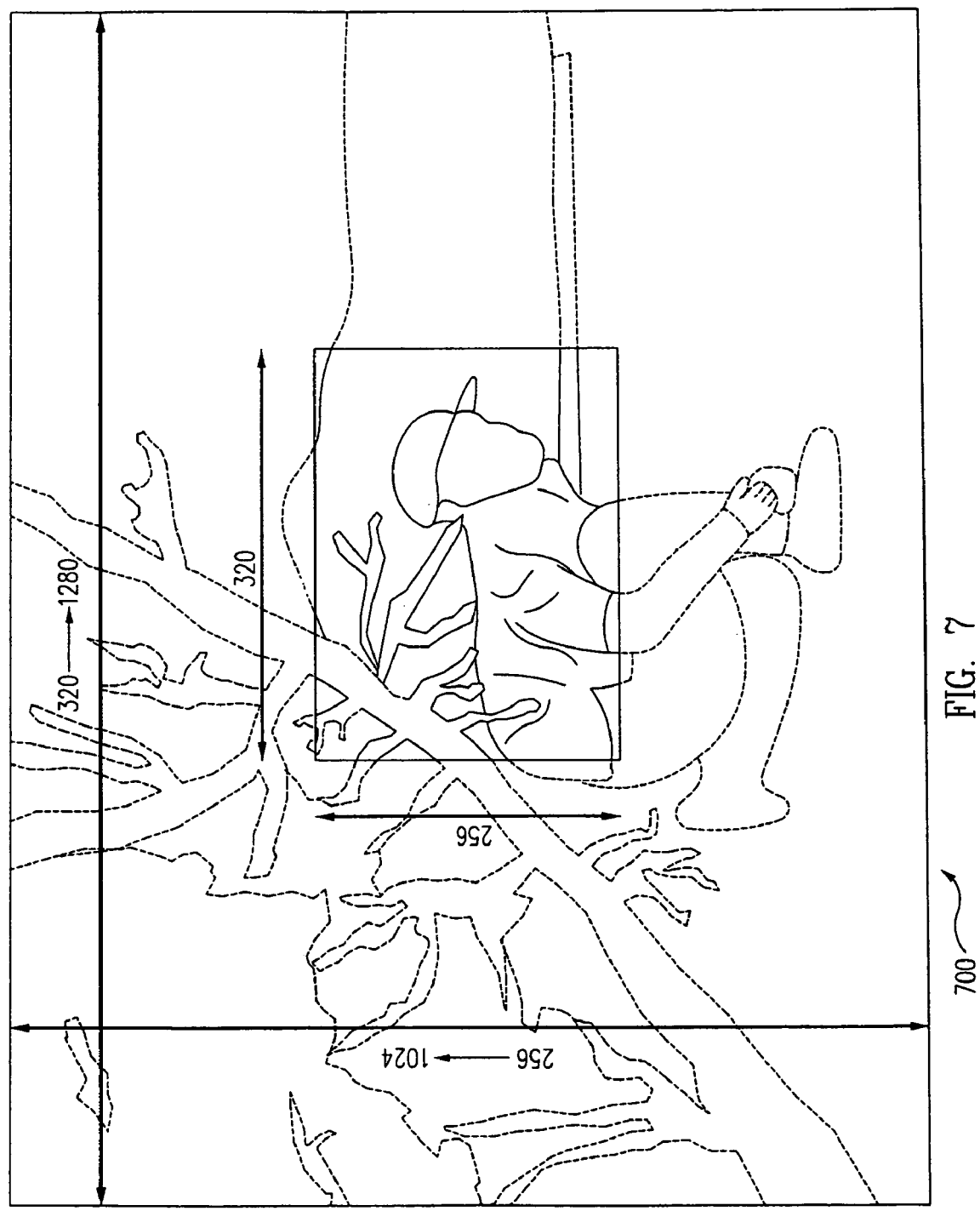
FIG. 7 shows an exemplary foveal view that can be provided by two cameras within a camera system in accordance with an embodiment of the present invention.

As an example, FIG. 6 shows an exemplary non-foveal provided by camera 102 of camera system 400 in accordance with an embodiment of the present invention. For this exemplary implementation, camera 102 has a 320 by 256 IR detector (e.g., a focal plane array). The image shown in FIG. 6 and provided by camera 102, for example, may be displayed within the image area provided by camera 104 as illustrated in FIG. 7 in accordance with an embodiment of the present invention. In this example, camera 104 may have an IR detector that may have a format from a 320 by 256 format to a 1280 by 1024 format.

As illustrated in FIG. 7, the image provided by camera 102 is inserted onto the image provided by camera 104 so that the device (e.g., device 504(1) of FIG. 5) can display the image provided by camera 102 centered within or otherwise positioned with respect to the image provided by camera 104. In this manner, a foveal image is provided. This type of Foveal is also a video compression technique because it presents the wide field for situational awareness and the narrow field for target ID in a combined scene that requires lower data amounts and can be transmitted at lower bandwidth than the full high-density image.

That is, video compression can be provided by combining a wide field scene having a comparatively lower resolution with a narrow field scene having a comparatively higher resolution. The resultant composite foveal image requires less storage space and transmission bandwidth that would the wide field scene created with the comparatively higher resolution.

Most of the wide field defines area of lesser interest. The narrow field defines area of greater interest. In this manner lossy video compression is effectively provided, but the loss is only in regions of lesser interest. Thus, the insertion of a comparatively higher resolution image into a comparatively lower resolution image can be used for video compression.

The two images on the display cooperate to define a foveal image that can provide certain advantages, such as for example in terms of local area contrast enhancement or automatic gain control (AGC) performed independently or uniformly for the two images. Indeed, as discussed in detail below, various parameters can vary between the two images to provide various beneficial results. For example, the image provided by camera 102 may have one AGC setting or zone, while the image provided by camera 104 would have another AGC setting or zone, or both images may have the same AGC setting or zone applied.

An operator may shift images being displayed from camera 102 and camera 104. For example, an operator may shift images relative to one another in the display, such as by providing manual offsets in X and Y screen coordinates. The images being displayed may also be automated to provide image orientation and real-time correlation and dynamic offsets.

Figure 8:
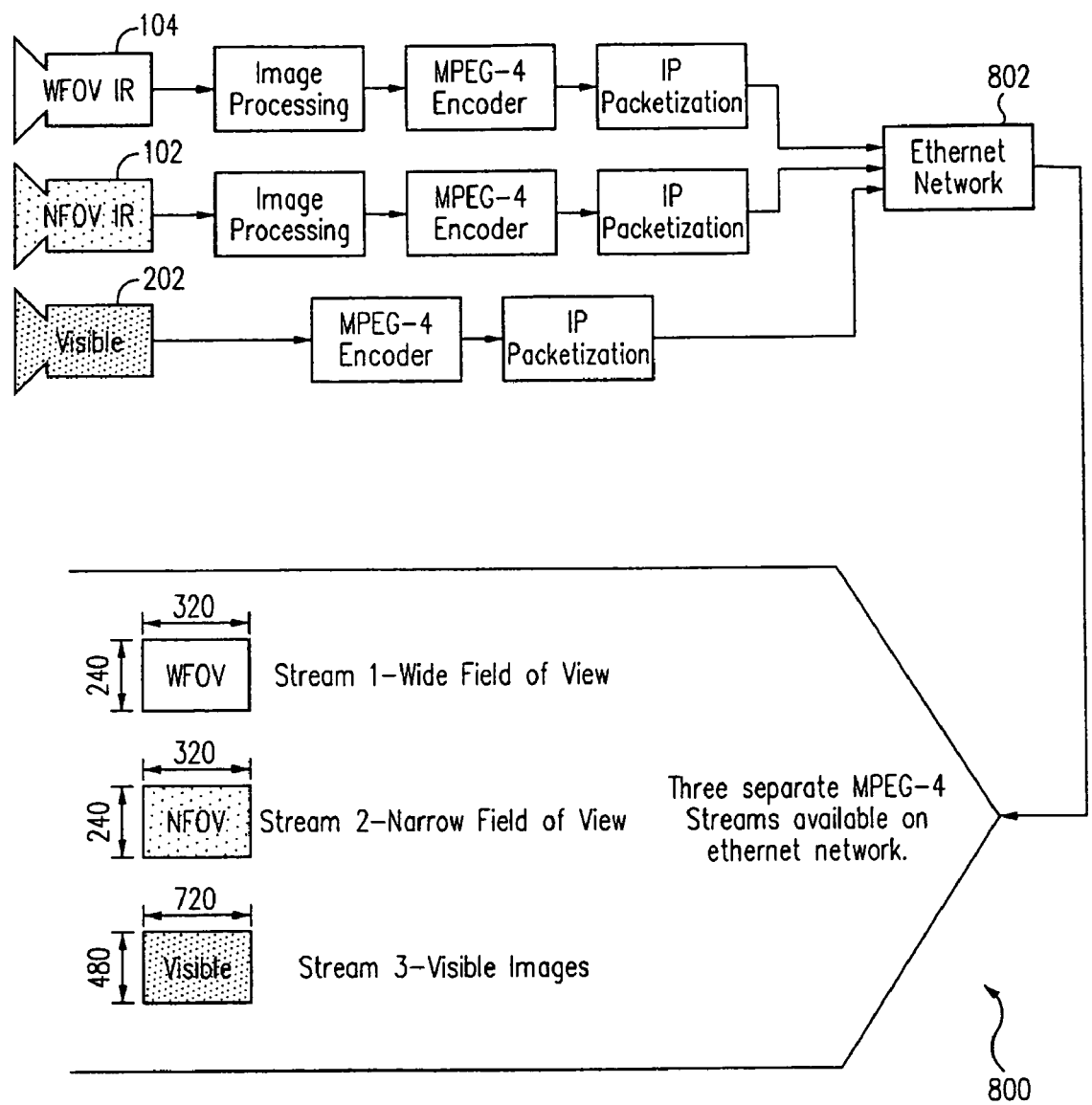
FIG. 8 shows a block diagram illustrating a camera system in accordance with an embodiment of the present invention.

As discussed herein, the data provided by cameras 102, 104, and 202 may be provided via a wired or a wireless interface. For example, FIG. 8 shows a block diagram illustrating a camera system 800 that can be used to form foveal images in accordance with an embodiment of the present invention. Camera system 800 may represent an exemplary implementation of camera system 200, 300, or 400 and include cameras 102, 104, and 202.

Camera system 800 illustrates a technique, in accordance with an embodiment of the present invention, of providing a separate data stream from cameras 102, 104, and 202. The data from cameras 102 and 104 may be processed (e.g., image processing block), encoded (e.g., MPEG-4 encoding or other type of encoding), and formatted (e.g., IP packetization), while the data from camera 202 may be encoded (e.g., MPEG-4 encoding) and formatted (e.g., IP packetization) to provide three separate data streams. The separate data streams may be combined in or utilized by a computer or other type of processing device (e.g., device 504 of FIG. 5).

For this exemplary implementation, three separate MPEG-4 data streams may be provided via an Ethernet network 802 from cameras 102, 104, and 202 to an external device. The processing, encoding, and formatting may be performed, for example, within the camera housing (e.g., housing of camera system 400). The field of views, shown in FIG. 8, illustrates exemplary dimensions provided by cameras 102, 104, and 202.

Figure 9:
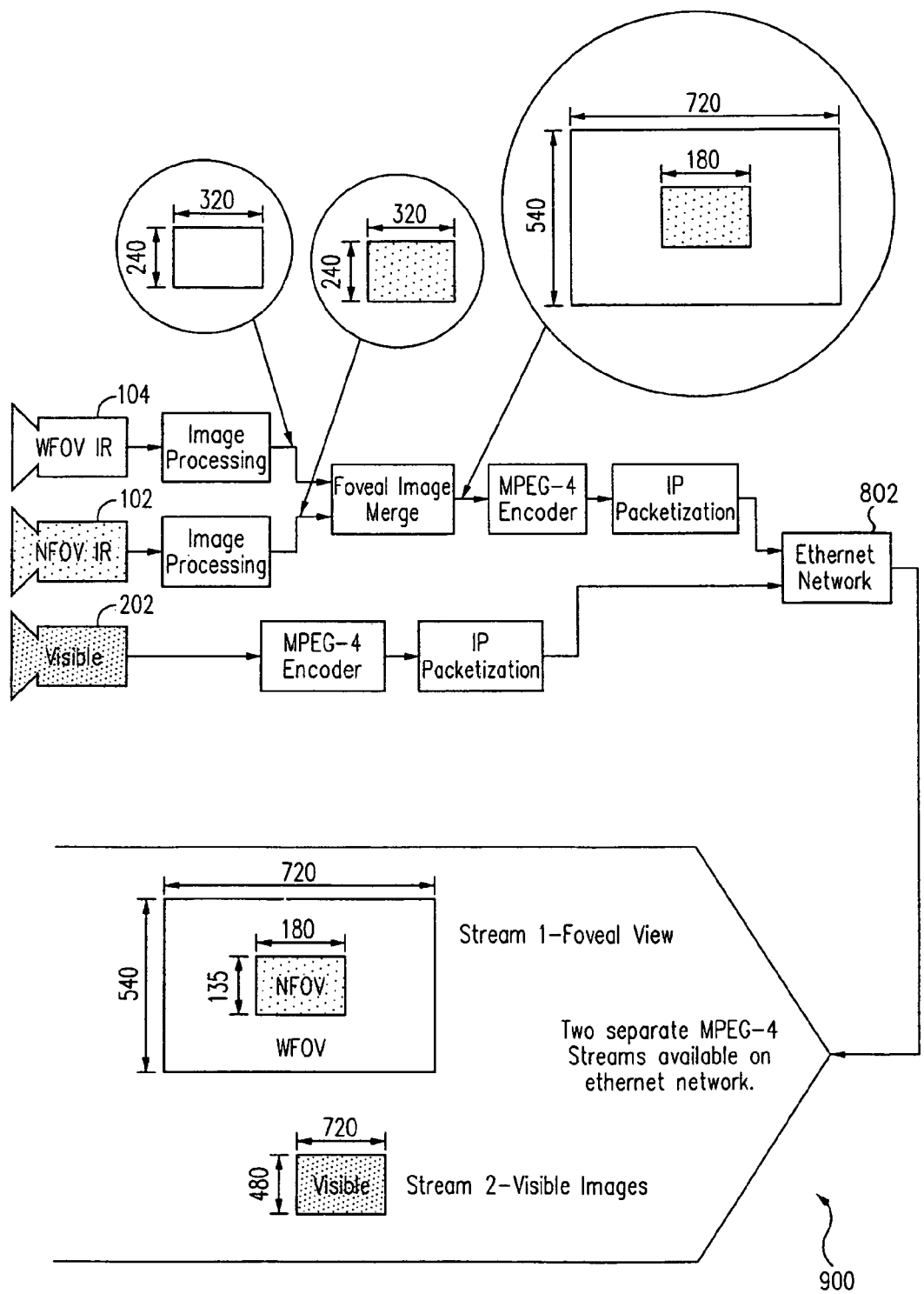
FIG. 9 shows a block diagram illustrating a camera system in accordance with an embodiment of the present invention.

As another example, FIG. 9 shows a block diagram illustrating a camera system 900 that can be used to form foveal images in accordance with an embodiment of the present invention. Camera system 900 is similar to camera system 800, but provides only two data streams by merging the data from cameras 102 and 104. For example, prior to encoding (e.g., MPEG-4 encoding), the data images from cameras 102 and 104 are merged into a foveal image as illustrated in FIG. 9. The foveal image merge may be performed by image processing or as a separate operation after completion of the image processing. For example, a processor may perform the processing, merging (if desired), encoding, and formatting of the data within the camera housing. Consequently, as illustrated, one data stream provided includes the foveal view (e.g., foveal thermal infrared (IR) data) from cameras 102 and 104, while another data stream includes the data from camera 202 (e.g., visible spectrum data).

As an example, Table 2 provides exemplary fields of view for cameras 102 and 104 for the exemplary implementation described in reference to FIG. 9. For this example, the foveal view composite image may be scaled into one MPEG-4 stream, with Table 2 providing exemplary horizontal and vertical dimensions (in pixels) along with scale factors. In general, camera system 800 may provide full resolution for cameras 102, 104, and 202 via separate data streams, while camera system 900 may provide, for example, a reduced resolution mode with a merged foveal output from cameras 102 and 104.

TABLE 2

| FOV | Horizontal | Vertical |
|---|---|---|
| Original WFOV | 320 | 240 |
| Composite WFOV | 1280 | 960 |
| Final WFOV | 720 | 540 |
| Original NFOV | 320 | 240 |
| Composite NFOV | 320 | 240 |
| Final NFOV | 180 | 135 |
| WFOV Scale Factor | 2.25 | 2.25 |
| NFOV Scale Factor | 0.5625 | 0.5625 |

In general, in accordance with an embodiment of the present invention, camera systems are disclosed that incorporate two or more cameras, with at least one camera having a narrow field of view and at least one camera having a wide field of view. The camera system may provide certain advantages over conventional camera systems (e.g., a camera having a dual or switchable field of view).

For example, by providing multiple camera cores and corresponding optics, improved performance and flexibility may be achieved, such as for example offering dual aperture systems and dual image capability, while increasing reliability and redundancy (e.g., for high reliability or mission critical applications). Reliability may be increased due to fewer/simpler mechanical systems or fewer moving parts. For example, a field of view change mechanism for a camera is not required and a focus mechanism may be applicable for only the narrow field of view camera. The power surge requirements may also be reduced due to the field of view change mechanism being eliminated. Furthermore, redundancy improves reliability. For example, if one camera fails, the other camera will still operate and, therefore, the probability of total camera system loss decreases (e.g., total image loss probability is reduced due to multiple camera apertures).

The camera system, in accordance with an embodiment of the present invention, may offer wide and narrow fields of view simultaneously to provide situational awareness (e.g., with the wide field of view) and long detection or recognition ranges (e.g., with the narrow field of view) simultaneously and with reduced required transmission bandwidth. Multiple operators may have simultaneous access to different views from the camera system having the wide and narrow field of view cameras.

Furthermore, there may be zero or minimal latency when switching between fields of view. For example, this benefit may reduce or eliminate loss of track problems that may generally occur with single camera systems when an operator or an auto tracker program must wait during the transition (e.g., two seconds) from one field of view to another. In addition, auto tracker programs can continue to track in the wide field of view, while an operator switches to the narrow field of view for a closer inspection, with no loss of track because the wide field of view image is maintained. If the auto tracker program switches to the narrow field of view, the probability of a loss of track is greatly diminished because there is little or no delay in viewing the selected field of view. Therefore, instantaneous field of view switching and foveal viewing modes may reduce or eliminate problems associated with conventional cameras.

Figure 10:
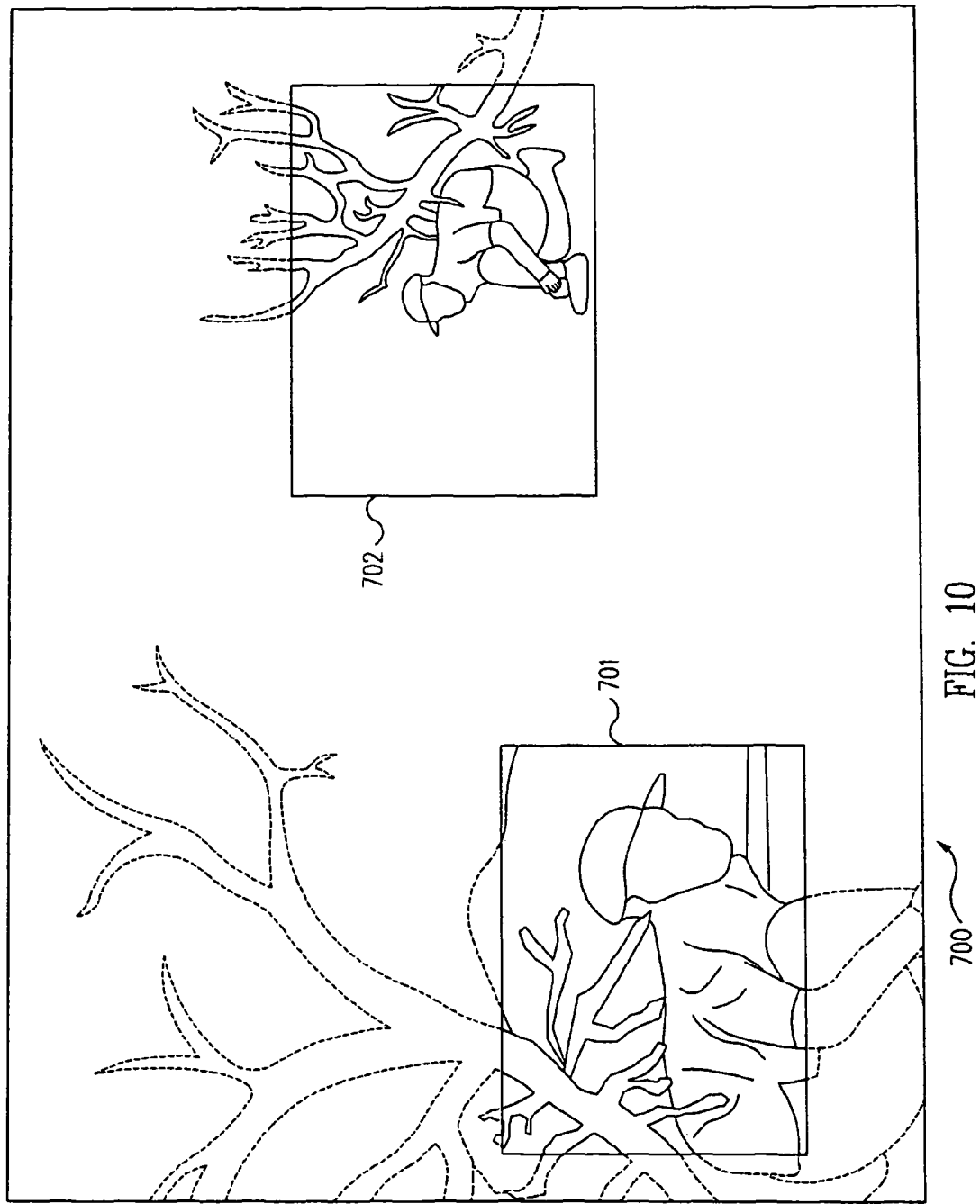
FIG. 10 shows an exemplary foveal view that can be provided by three cameras within a camera system in accordance with an embodiment of the present invention.

As illustrated in FIG. 10 in accordance with an embodiment of the present invention, image 700 provided by a first camera can have an image 701 provided by a second camera inserted therein, as discussed in detail above. Image 700 provided by the first camera can also have another image 702 provided by a third camera inserted therein, as well. Indeed, image 700 provided by the first camera can have any desired number of images provided by additional cameras inserted therein. Thus, image 700 provided by the first camera can have one, two, three, four, or more images inserted therein. Moreover, any desired portion of image 700 can be enhanced or otherwise changed by providing an inserted image having desired characteristics at the location of the desire portion of image 700.

Each of the smaller images, such as images 701 and 702, inserted within larger image 700, can be from cameras having a comparatively narrow FOV with respect to the FOV of the camera from which larger image 700 is formed. However, the FOV of the camera that provides the inserted smaller images, 701 and/or 702, does not have to be narrower than the FOV of the camera that provides larger image 700.

At least one parameter is different between the larger image and the smaller image(s). Further, one or more parameters can be different between the smaller images. The parameter(s) can relate to the camera, image processing, or the display, for example.

Some examples of such parameters include color balance, color fusion, compression (type and/or rate), contrast, edge enhancement, encoding, field of view, focus (auto versus manual focus and/or sharp versus fuzzy focus), frame rate, illumination (e.g., passive/active), intensity (brightness), magnification, phase, polarization, spectrum (e.g., visible, infrared, and/or other electromagnetic regions), warping, and image stabilization. Other parameters are likewise suitable.

Further, according to one aspect of the present invention, the parameters can be varied. That is, the values of the parameters can be selected by a user or by a device, e.g., a processor or computer algorithm. Thus, the values of the above listed parameters for one or both cameras can be determined in real time. For example, the spectrum (e.g., infrared) may be varied by selecting the desired filter (e.g., on a filter wheel) for one or more of the cameras.

The color balance of smaller image, 701 or 702, can be adjusted so as to make particular colors more visible. Similarly, the color balance of larger image 700 can be adjusted so as to make particular colors less visible. In this manner, items in a smaller image, 701 or 702, can be made to stand out with respect to the larger image 700 of FIG. 10, for example.

Contrast can similarly be adjusted so as to emphasize some aspect of smaller image, 701 or 702, with respect to larger image 700. For example, the contrast of smaller image, 701 or 702, can be enhanced so as to make desired features of objects within smaller image, 701 or 702, more apparent.

Intensity can similarly be adjusted so as to emphasize some aspect of smaller image, 701 or 702, with respect to larger image 700. For example, the intensity of smaller image, 701 or 702, can be enhanced so as to make desired features of objects within smaller image, 701 or 702, more apparent.

Phase can be adjusted by placing a phase retarder in front of one of the cameras. This can be accomplished via the use of a filter wheel or the like. Polarization can be varied in a similar fashion. The spectrum viewed can be varied in a similar manner. Alternatively, camera dependent parameters such as phase, polarization, and spectrum can be varied by selecting different cameras.

Filters for each camera can be made by various techniques. Multi-layer dielectric filters can be developed with a mask so that different pixels have different characteristics. The filter would have fiducial marks for alignment to the focal plane array to align it to within a faction of a pixel. In this manner, different pixel can have different filtering. Alternatively, all of the pixels of a camera can have the same filtering.

Additionally, the filter can be made by photolithographic techniques so that different phases or polarizations can be produced or provided to a pixel. Different phases can be realized by selective etching of a high index of refraction material, like germanium in a pattern of high and low elevations, producing a phase shift like defocus of the incoming wavefront. Also, different dyes, having different indices of refraction, can be placed on top of the pixels, such as by using contemporary mask and photolithography techniques.

In addition to the use of filters, structures for effecting the discrimination of characteristics of the light can be built into the pixel structure. This is especially true of active/passive multidimensional imagery and motile integration time (temporal) imagery. In these cases, the read out structure would be different from pixel to pixel, exploiting a natural difference in the incoming radiation.

Focus can similarly be adjusted so as to emphasize some aspect of smaller image, 701 or 702, with respect to larger image 700. For example, the focus of smaller image, 701 or 702, can be sharper and the focus of larger image 700 can be fuzzier, so as to make objects within smaller image, 701 or 702, stand out with respect to objects within larger image 700.

Image stabilization can be applied to smaller image, 701 or 702, as well as to larger image 700. Image stabilization can be performed optically, mechanically, and/or in software, as desired.

The frame rate can be different for a smaller image, 701 or 702, with respect to larger image 700. The frame rate can be adjusted so as to provide a desired quality of image while maintaining required bandwidth constraints. This is especially important for trackers, and this can be used to facilitate remote trackers operating on the transmitted video.

Edge enhancement can be applied to smaller image, 701 or 702, so as to enhance the ability of a view to discern detail within smaller image, 701 or 702. Edge enhancement tends to make the interface between adjacent vertical structures sharper.

Compression can be different for larger image 700 and smaller image, 701 or 702. Both the type and compression rate can be varied. Compression can be set to a value that provides adequate results while maintaining required bandwidth constraints.

Similarly, encoding can be different for larger image 700 and smaller image, 701 or 702. Encoding can generally be any type that maintains required bandwidth constraints.

The field of view can be different for smaller images, 701 and 702, with respect to larger image 700. The precise fields of view for smaller images, 701 and 702, and for larger image 700 can be selected. The field of view can be varied by selecting different cameras. The field of view can also be varied by selecting different zooms or magnifications.

The illumination provided to the subject matter of smaller images, 701 and 702, and to the subject matter of larger image 700 can be varied. For example, the subject matter of smaller image, 701 or 702, can be illuminated with an infrared source (e.g., active imaging), so as to enhance the quality of smaller image, 701 or 702. Because active illumination can be used, image 701 can lack active infrared illumination while image 702 can have active infrared illumination, for example.

The spectrums used to form the larger and smaller images can be different. Any desired spectral components can be used to form either of the larger and smaller images. Examples of such spectral bands include, visible light or some component thereof, such as red, blue, or green light; infrared light or some component thereof, such as very long wavelength infrared (VLWIR), long wavelength infrared (LWIR), medium wavelength infrared (MWIR), short wavelength infrared (SWIR), near infrared (NIR), the J infrared band, the K infrared band, the L infrared band, the M infrared band, the $CO_2$ atmospheric infrared absorption region, and the H₂O atmospheric infrared absorption region; radar such as synthetic aperture radar (SAR) or other radar imaging (e.g., millimeter wave radar). Moreover, any portion of the electromagnetic spectrum that is imagable may be used to form either the larger image or the smaller image(s). As an example, the appropriate device (e.g., a radar or lidar system) may be included within the system (e.g., camera system 300) or the data for the desired electromagnetic spectrum may be provided to the system for processing, if necessary, and/or directly for display.

Generally, any parameter that can be varied or controlled for small image, 701 or 702, can similarly be varied for larger image 700. Indeed, one or more parameters can be set to be the same for smaller image, 701 or 702, and larger image 700. Thus, larger image 700 can be a visible light image, both of the smaller images, 701 and 702, can be infrared images, and the frame rates and resolutions of the cameras used to make all three images can be different, for example.

The position of smaller images, 701 and 702, within larger image 700 can be varied. For example, the arrow keys of a keyboard, a joystick, mouse, or other pointing device can be used to determine the size and/or location of smaller images 701 and 702 within larger image 700 via software and/or hardware. The size and shape, e.g., aspect ratio, of the smaller images, 701 and 702, can similarly be varied.

Fusion (or spectral fusion) can be defined as the combining of different spectral data for a given pixel or group of pixels so as to determine a color to be displayed. Thus, images from two different cameras, each having a different spectral response, can be combined to provide a displayed image (e.g., as image 701 or image 700) that has some characteristics of the data provided by both cameras.

Furthermore, for example, the amount of fusion can vary between the larger image and the smaller image(s). For example, the larger image can be formed from one unfused color so as to provide a monochrome image, while the smaller image(s) can be formed from the fusion of red, blue, and green so as to provide one or more composite color images. Alternatively, the larger image can be formed from the fusion of red, blue, and green so as to provide a color image, while the smaller image(s) are formed from one unfused color so as to provide one or more monochrome images. For example, fusion may also be performed using different spectral infrared spectral bands. Thus, fusion can result from the combination of any desired data, such as from the combination of different spectral components (such as red, blue, green, infrared, ultraviolet, etc.). For example, fusion may be performed using different portions of the infrared spectrum. The larger image and/or the smaller image can contain any desired combination of such components, so as to define a desired fusion of data for the images.

The larger image and the smaller image(s) can be fused (this image fusion is different from the color fusion discussed above). That is, the interface or border between the larger and smaller images can be made to provide a generally smooth transition therebetween. The larger and/or smaller images can be warped so as to provide such image fusion. As those skilled in the art will appreciate, warping is a process wherein image pixels are moved such that after warping the pixels at the same image coordinates of both images refer to the same locations in the real world. Thus, a smooth transition between the larger and smaller images is provided.

Synthetic imagery, such as that provided by LIDAR or radar, such as synthetic aperture radar (SAR), can be used to form the larger image, the smaller image(s), or any combination or portion thereof. Thus, a high resolution real image embedded in a lower resolution synthetic image can be formed. Similarly, a high resolution synthetic image embedded in a lower resolution real image can be formed. Indeed, any desired combination of resolution, e.g., high or low resolution, real, and synthetic images can be formed.

Figure 11:
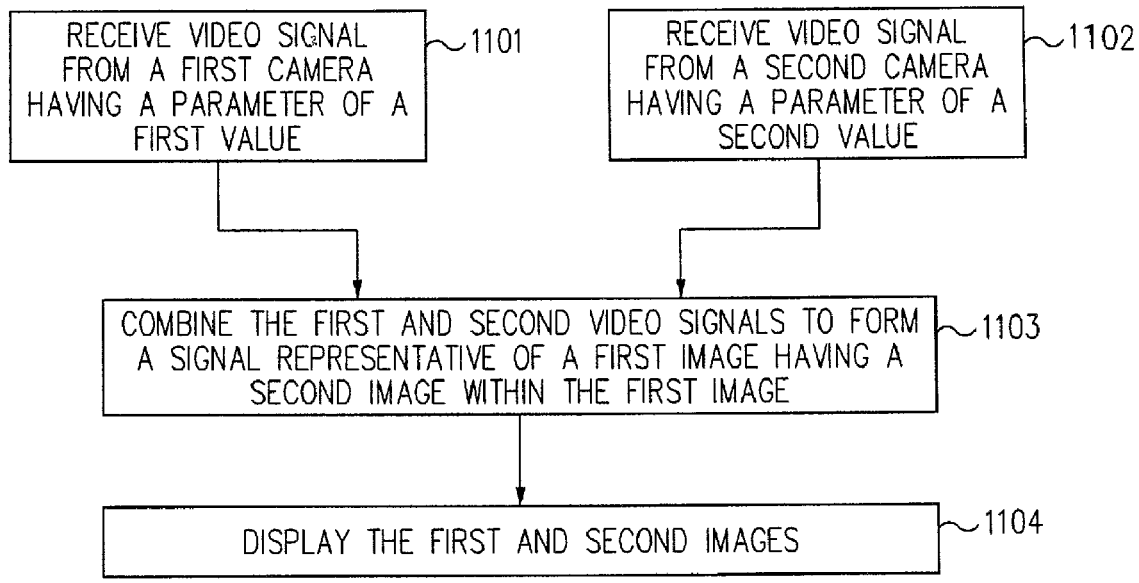
FIG. 11 shows a flow chart illustrating the combination of video signals having at least one differing parameter so as to facilitate the formation of a foveal image such as that shown in FIG. 7 in accordance with an embodiment of the present invention.

FIG. 11 shows a flow chart that illustrates the combining of video signals that have at least one differing parameter in accordance with an embodiment of the present invention. This combination facilitates the formation of a foveal image such as that shown in FIG. 7. A video signal is received from a first camera, as indicated in block 1101. Similarly, a video signal is received from a second camera, as indicated in block 1102. At least one parameter associated with the video cameras, processing of the video signals, and/or display of the resulting images is different between the video signal from the first camera and the video signal from the second camera.

The first and second video signals are combined so as to form a signal that is representative of a first image having a second image formed therein, as indicated in block 1103. That is, the second image is overlaid within the first image so as to form a foveal image or view.

The first and second images are displayed, as indicated in block 1104. FIG. 7 is one example of a foveal image that can result from such combined images.

Figure 12:
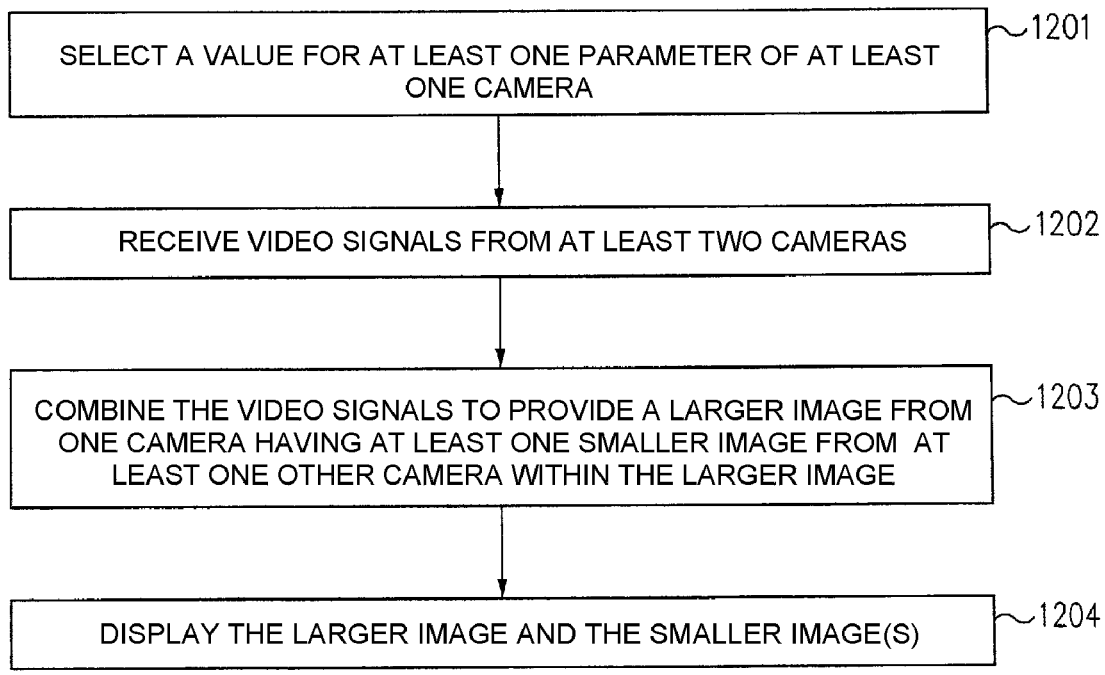
FIG. 12 shows a flow chart illustrating the selection of the differing parameter(s) and the subsequent combination of video signals so as to facilitate the formation of a foveal image, such as the three camera foveal image of FIG. 10, in accordance with an embodiment of the present invention.

FIG. 12 shows a flow chart that illustrates the process of selecting one or more parameters so as to define the characteristics of a foveal image, such as that of FIG. 10, in accordance with an embodiment of the present invention. A value for at least one parameter of at least one camera is selected. The value can relate to the camera itself, processing of the video signal from a camera, and/or the displaying of an image. Some examples of such parameters include color balance, compression (type and/or rate), contrast, edge enhancement, encoding, field of view, focus (auto versus manual focus or sharp versus fuzzy focus), frame rate, illumination, intensity (brightness), magnification, phase, polarization, spectrum, and stabilization. Other parameters are likewise suitable.

The selection of a parameter can be either manual or automatic. For example, a user can manually select one or more parameters that provide a desired foveal image. Alternatively, a computer or other device can automatically select one or more parameters that fit predetermined criteria or that cause the image to fit predetermined criteria. For example, a spectrum of one of the smaller images, 701 and 702 can be defined that provides a predetermined resolution. This selection can be according to predetermined rules or can result from trial and error (as in a feedback loop).

The video signals from at least two cameras are received, as indicated in block 1202. The video signals can be received at a location that is within or proximate to the video cameras. Alternatively, the video signals can be received at a location that is remote with respect to the video cameras.

The video signals are combined, as indicated in block 1203. As discussed above, the video signals from any desired number of cameras can be combined. The video signals are combined so as to provide a larger image from one camera having at least one smaller image from at least one other camera within the larger image.

The larger image and the smaller image(s) are displayed, as indicated in block 1204. The larger image and the smaller image(s) are displayed in a foveal view, like those of FIGS. 7 and 10. Because the parameters of the larger image and/or the smaller images can be tailored to the situation, images having enhanced utility can be formed.

The process of selecting a value for at least one parameter of at least one camera can be repeated, as desired. In this manner, the user or an automated process can fine tune the parameter(s) in real time, so as to further enhance the utility of the camera system.

Although the cameras discussed and shown herein are collocated (located proximate one another), the cameras do not have to be collocated. The cameras can be located any desired distance from one another. Thus, the cameras can be located different distances from an imaged scene. Indeed, the cameras can image a scene from different angles, including an angle of 180° (wherein one camera images a scene from the front thereof. and another camera images the scene for the back thereof). As a further example, one or more cameras can be terrestrial and one or more cameras can be on aircraft or satellites.

Similarly, although the imaging can be real time from all cameras, this does not have to be the case. Images from one or more cameras can be delayed. Such delay can be intentionally introduced, if desired. The delays can be of any desired duration, including delays from fractions of a second to months or more.

The camera system, in accordance with an embodiment of the present invention, may enable certain image processing features, such as for example the foveal display or foveal camera system approach, stereo vision or stereo enhancement, image enhancement, and/or improved resolution. The optics for the cameras within the camera system may be simpler and offer better optical performance at a reduced cost. The optics may provide better transmission, possibly lower f-stop values (i.e., wider apertures), improved non-uniformity correction between field of views, and less sensitivity to off-axis radiation, which may reduce the need for through-the-lens flat fields.

One example of an application of the present invention is the combination of a three-dimensional (3D) range image (such as a LIDAR image) with a non-3D image, such as an infrared or visible light image. For example, the 3D range image could be a smaller image within a larger infrared or visible light image, or vice versa. Thus, lidar could be used to form the larger image and a narrow FOV camera could be used to form the smaller image. Alternatively, a wide FOV camera could be used to form the larger image and lidar could be used to form the smaller image. A smaller 3D image can be formed within a larger 3D image to provide a foveal view.

Furthermore, one or more additional parameters may be applied to one or more of the foveal images. For example, one additional parameter that may be applied is fusion (e.g., fusing 3D images with the infrared images or fusing 3D lidar with polarized and non-polarized images).

In accordance with another embodiment of the present invention, an artificial image can be combined with a real image. For example, a high resolution pre-stored image can be combined with real time data from a scene being imaged. Thus, a LIDAR, radar, visible light, or infrared larger real image can have a picture (such as that of a soldier, a military vehicle, a plane, or a ship) inserted therein as a smaller image.

This can be done, for example, so as to better show an item in the smaller image. For example, if it is difficult to provide a real image of a ship, then an artificial image of the same ship, a similar ship, or an altogether different ship can be displayed instead.

Characteristics of the artificial image can be varied in the display so as to correspond to characteristics of a real item that the artificial image represents. Thus, the bigger the real ship is, the bigger the displayed artificial ship can be, for example. Similarly, if the type of the real ship can be determined (either by a person or a device), then an artificial ship of the same type can be displayed.

Alternatively, a high resolution artificial larger image can be combined with a real smaller image. For example, a daytime scene could be imaged under ideal conditions (such as bright sunlight) and the image could then be stored. At night, the high resolution daytime image could serve as the larger image, while a narrow FOV infrared camera could provide smaller images that are inserted into the larger images at the appropriate positions (such as at the positions where the narrow FOV infrared camera is pointing).

Thus, according to one or more aspects of the present invention, any desired combination of real and artificial images can be combined using any desired combination of values of parameters. In this manner, enhanced imagery having applications in a wide variety of fields can be provided.

The images, whether real or artificial, do not have to originate within a given display system. Rather, images from diverse systems can be combined to form foveal views according to the present invention. For example, a low resolution satellite image can be used to define the larger image of a foveal view and a high resolution infrared image can be used to define the smaller image thereof.

As used herein, the term foveal can refer to one or more smaller images within a larger image, wherein a value associated with at least one parameter of one image is different from a value associated with the same parameter of the other image. Generally, although not necessarily, the parameter of the smaller image can be enhanced with respect to the parameter of the larger image. Thus, some characteristic of the smaller image will generally, although not necessarily, be enhanced with respect to the same characteristic of the larger image. For example, the resolution of the smaller image can be better than the resolution of the larger image.

Rather than being enhanced, the parameter of the smaller image can merely be different with respect to the same parameter of the larger image. For example, the two images can be representative of different spectrums. Thus, the parameters of bandwidth displayed can be different without one necessarily being considered better than that of the other.

The use of such foveal images can substantially enhance the ability of viewers to accurately and reliably interpret the content of images. Such enhanced accuracy and reliability can save lives in military and police applications. It can provide substantial cost savings in various civilian applications such as forestry, agriculture, and surveillance.

Visible light can be light obtained by electro-optical (EO) methods, such as via photomultipliers, night vision devices, or other methods. Thus, visible light does not have to be obtained directly or via only optical methods.

Embodiments described above illustrate but do not limit the invention. It should also be understood that numerous modifications and variations are possible in accordance with the principles of the present invention. Accordingly, the scope of the invention is defined only by the following claims.

We claim:

1. A camera system comprising:
a camera housing;
a first camera, secured with the camera housing, adapted to provide first image data from a first portion of an electromagnetic spectrum, wherein the first camera is adapted to provide a wide field of view;
a second camera, secured with the camera housing, adapted to provide second image data from a second portion of the electromagnetic spectrum, wherein the second camera is configured to provide a narrow field of view disposed within the wide field of view of the first camera, and wherein at least one parameter associated with generating the first image data of the first camera is different than the at least one parameter associated with generating the second image data of the second camera;

a third camera, secured within the camera housing, adapted to provide third image data covering a visible portion of the electromagnetic spectrum, wherein the third camera is configured to provide a field of view disposed within the wide field of view of the first camera;

a first processor, secured within the camera housing, adapted to receive the first image data from the first camera, the second image data from the second camera, and the third image data from the third camera to provide the first image data, the second image data, and the third image data as one or more network data streams to a network, with at least one of the network data streams providing a foveal view composite image which has been scaled and encoded with different scale factors; and wherein the camera housing encloses the first camera, the second camera, the third camera, and the first processor and forms a first camera system, and wherein a remote processor coupled to the network is able to receive the network data streams from one or more of the first camera systems to select from among the network data streams to store and/or display.

2. The camera system as recited in claim 1, further comprising means for moving the camera housing, wherein the first camera and the second camera are infrared cameras, and wherein the at least one parameter comprises illumination or polarization.

3. The camera system as recited in claim 1, further comprising means for moving the camera housing, wherein the network data streams provide a first network data stream corresponding to the third image data and at least a second network data stream corresponding to the first image data and the second image data to provide a spectrally fused image for the foveal view composite image.

4. The camera system as recited in claim 1, further comprising a display adapted to display images from the network data streams, wherein the display is further adapted to display at least one of radar data and lidar data along with the selected network data streams, and wherein the first processor is adapted to provide an artificial image to display along with at least one of the first image data, the second image data, the third image data, or the foveal view composite image.

5. The camera system as recited in claim 4, wherein the at least one of radar data and lidar data provides spectrally fused imagery.

6. The camera system as recited in claim 1, wherein the field of view of the third camera is centered within the narrow field of view of the second camera which is centered within the wide field of view of the first camera relative to a certain distance from the camera housing.

7. The camera system as recited in claim 1, wherein the at least one parameter comprises a color balance, a compression type, and/or a compression rate.

8. The camera system as recited in claim 1, wherein the at least one parameter comprises a contrast, a frame rate, and/or an intensity.

9. The camera system as recited in claim 1, wherein the first processor is adapted to provide image processing, image merging, encoding, and formatting of the first, second, and third image data.

10. The camera system as recited in claim 1, wherein the at least one parameter comprises encoding, focus, and/or frame rate.

11. The camera system as recited in claim 1, further comprising an interface adapted to provide a wireless interface to the network.

12. The camera system as recited in claim 1, further comprising means for moving the camera housing, wherein the first camera and the second camera are infrared cameras, and wherein the first portion of the electromagnetic spectrum differs from the second portion.

13. The camera system as recited in claim 1, wherein the first processor is adapted to provide image stabilization, edge enhancement, and/or warping for the first, second, and/or third image data.

14. The camera system as recited in claim 1, wherein the at least one parameter comprises a variable portion of the electromagnetic spectrum to be imaged by the first and second cameras.

15. The camera system as recited in claim 1, wherein the at least one parameter comprises a frame rate, an edge enhancement, and/or a polarization, which are variable.

16. The camera system as recited in claim 1, wherein:
the first camera is adapted to provide the first image data comprising infrared image data having a first polarization, a first spectral fusion, and based on an active illumination;
the second camera is adapted to provide the second image data comprising infrared image data having a second polarization, a second spectral fusion, and not based on an active illumination; and
a display system adapted to show the first image data and the second image data as the foveal view composite image.

17. The camera system as recited in claim 1, further comprising:
at least one of a LIDAR transceiver and a radar transceiver; and
a display system adapted to show image data from the first camera system and the at least one of a LIDAR transceiver and a radar transceiver as a foveal image.

18. The camera system as recited in claim 1, further comprising:
the remote processor adapted to receive fourth image data from the network, wherein the fourth data image data is provided from a radar system or a lidar system;
a memory adapted to store the first, second, third, and fourth image data, wherein the first image data has a lower resolution than the second image data; and
a display system adapted to show the first, second, third, and fourth image data in various combinations as a foveal image.

19. The camera system as recited in claim 18, wherein the first image data provides a real image and the fourth image data provides a synthetic image.

20. The camera system as recited in claim 18, wherein the first image data and the second image data provides infrared image data and the fourth image data provides a real image, and wherein the first processor is adapted to provide an artificial image to display along with at least one of the first image data, the second image data, the third image data, or the foveal view composite image.

21. The camera system as recited in claim 18, wherein at least one of the first and second image data provides an infrared image and the fourth image data provides a radar image.

22. The camera system as recited in claim 18, wherein at least one of the first and second image data provides an infrared image and along with the fourth image data provides a fused three-dimensional image.

23. The camera system as recited in claim 18, wherein the first and second image data provide infrared images covering different portions of the electromagnetic spectrum and the fourth image data provides radar images.

24. The camera system as recited in claim 18, further comprising a pan/tilt mechanism adapted to move the camera housing, and wherein the first and second image data provide infrared images covering different portions of the electromagnetic spectrum and the fourth image data provides lidar images.

25. The camera system as recited in claim 18, wherein the field of view of the third camera is centered within the narrow field of view of the second camera which is centered within the wide field of view of the first camera relative to a certain distance from the camera housing.

26. The camera system as recited in claim 18, wherein the at least one parameter comprises a color balance, a compression type, and/or a compression rate.

27. The camera system as recited in claim 18, wherein the at least one parameter comprises a contrast, a frame rate, and/or an intensity.

28. The camera system as recited in claim 18, wherein the first processor is adapted to provide image processing, image merging, encoding, and formatting of the first, second, and third image data.

29. The camera system as recited in claim 18, further comprising an interface, disposed at least partially within the camera housing, adapted to provide a wireless interface from the camera housing to the network.

30. A method for providing a foveal image, the method comprising:
generating first thermal image data, from within a first camera housing, covering a narrow field of view;
generating second thermal image data, from within the first camera housing, covering a wide field of view, wherein the narrow field of view of the first thermal image data is disposed in a first area of the wide field of view of the second thermal image data, and wherein at least one parameter associated with the generating of the first thermal image data differs from the at least one parameter associated with the generating of the second thermal image data;
generating first visible image data having a first field of view from within the first camera housing, wherein the first field of view of the first visible image data is disposed in a second area of the wide field of view of the second thermal image data;
providing the first visible image data, the first thermal image data, and the second thermal image data from the first camera housing as network data streams to a network, with at least one of the network data streams providing a foveal view composite image which has been scaled and encoded with different scale factors; and
wherein the network data streams are provided to the network such that a computer coupled to the network is able to receive the network data streams to select from among the network data streams to store and/or display the corresponding image data.

31. The method as recited in claim 30, further comprising selecting, by each of the computers coupled to the network, from the network data streams provided on the network from the first camera housings, and wherein the network data streams correspond to the first thermal image data, the second thermal image data, the first visible image data, and the foveal view composite image.

32. The method as recited in claim 30, further comprising moving the first camera housing to point in a desired direction, and wherein the narrow field of view and the first field of view are centered within the wide field of view for a certain viewing distance from the first camera housing.

33. The method as recited in claim 30, wherein the providing comprises image processing, image merging, encoding, and formatting for at least the first and second thermal image data, and wherein the at least one parameter comprises polarization, phase, frame rate, and/or portion of the electromagnetic spectrum.

34. The method as recited in claim 30, wherein the at least one parameter comprises illumination, polarization, portion of the electromagnetic spectrum imaged, compression type, and/or compression rate.

35. The method as recited in claim 30, wherein the at least one parameter comprises contrast, color balance, edge enhancement, image stabilization, and/or intensity.

36. The method as recited in claim 30, wherein the providing to the network comprises a wireless transmission.

37. The method as recited in claim 30, further comprising providing one or more artificial images to display within a designated area of an image along with at least one of the first visible image data, the first thermal image data, or the second thermal image data.

* * * * *